Sept. 6, 1932.                 F. POLLAK                 1,875,491
                      MANUFACTURE OF SPUN GLASS
                         Filed May 21, 1931

F. Pollak
   INVENTOR

By Marks & Clerk
          ATT'YS.

Patented Sept. 6, 1932

1,875,491

UNITED STATES PATENT OFFICE

FELIX POLLAK, OF VIENNA, AUSTRIA

MANUFACTURE OF SPUN GLASS

Application filed May 21, 1931, Serial No. 539,074, and in Great Britain February 28, 1931.

This invention relates to the manufacture of glass threads and has for its object to provide improved means for heating the raw glass to the required plastic condition.

The invention comprises the combination with a heating chamber provided with one or more so-called spinning, or outlet, nozzles or apertures, of a pair of heating elements arranged parallel with each other within the chamber adjacent to the spinning nozzles, the heating elements being so disposed that the whole or the greater part of the plastic glass passes between them before entering the nozzles.

Also the invention comprises the combination with the heating chamber, of one or more additional heating elements situated adjacent the other two elements at the side remote from the nozzles.

Further, the invention comprises the construction of each heating element from an electric resistance, and an envelope of refractory material having high thermal conductivity.

In the accompanying sheet of explanatory drawing:—

Figure 1:
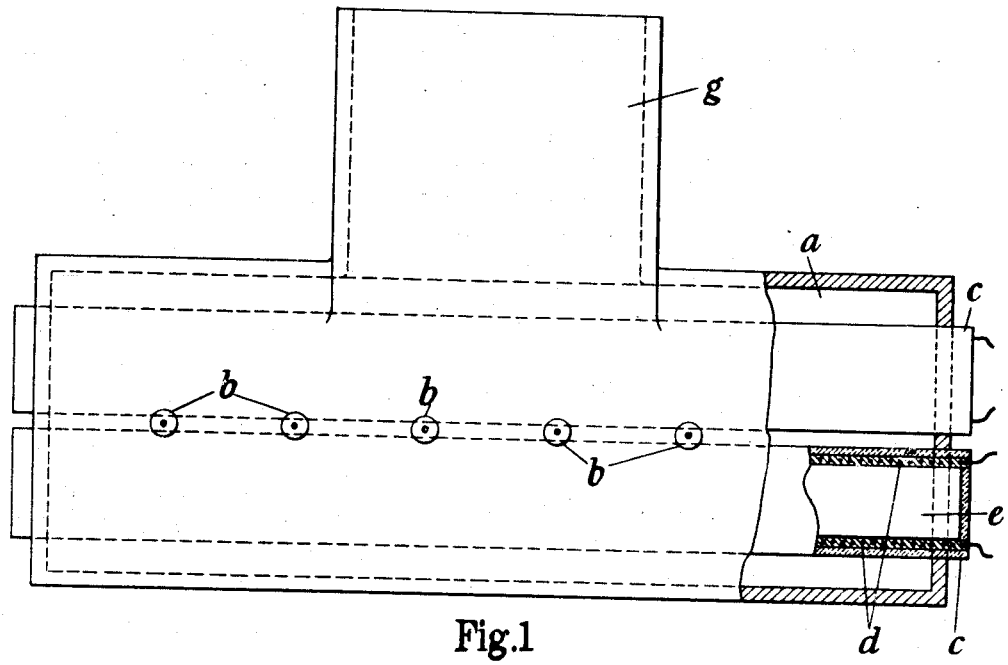
Figure 2:
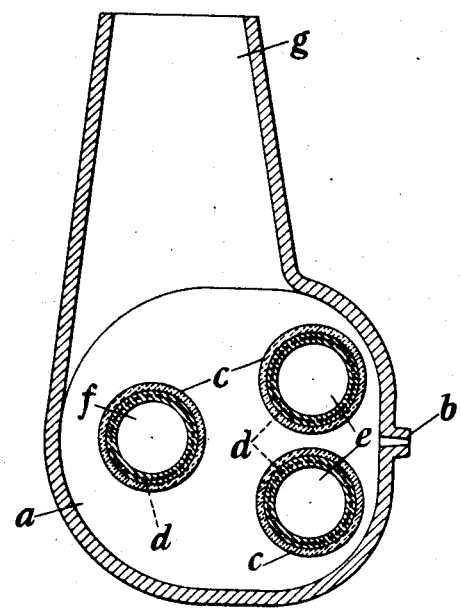

Figure 1 is a front elevation with part in section of a glass heating apparatus constructed in accordance with this invention, and Figure 2 is a cross section of the same.

In carrying the invention into effect as shown, the glass is melted in a chamber $a$ of approximately cylindrical form. The chamber is made from any convenient refractory material, such as burnt fireclay, and along one side is provided with one or more spinning nozzles $b$ through which, or each of which, the glass can be withdrawn from the chamber in the form of a fine filament.

Within the heating chamber is arranged a plurality of heating elements. Each element consists of a tube $c$ of refractory material extending along the whole or the greater part of the length of the chamber and containing a resistance $d$ through which an electric current can be passed. The refractory material from which the tube or envelope containing the resistance is made is of dense character and has relatively high thermal conductivity. Porcelain is a convenient material. In all cases it is desirable to use a material which will enable a thin tube to be used so that the temperature difference between the inner and outer sides of the tube when heated is as small as possible.

Two such heating elements $e$ are arranged parallel with each other near the inlet to the nozzles, and they are so disposed that the whole or the greater part of the glass must pass between these heating elements before entering the nozzles as shown in Figure 2. Also it is preferred as shown in Figure 2 to arrange a third heating element $f$ parallel with the other two at the side remote from the nozzles and opposite the gap between the first mentioned elements. If desired, more than one additional heating element may be employed in association with the principal pair of elements.

The upper side of the heating chamber may be provided with a charging hopper $g$.

By this invention I am able to effect the required heating of the glass and the necessary regulation of temperature, in a simple, convenient and economical manner.

Having thus described my invention what I claim as new and desire to secure by Letters Patent is:—

1. In means for heating raw glass for use in the manufacture of glass threads, the combination of a heating chamber having outlet means through which glass can be withdrawn from the chamber in filament form, and a pair of heating elements spaced apart in parallel relation within the chamber adjacent to the outlet means, the relative disposition of the outlet means and heating elements being such that the said means are opposite to the space between said elements, substantially as described.

2. In means for heating raw glass in the manufacture of glass threads, the combination of a heating chamber having outlet means through which glass can be withdrawn from the chamber in filament form, a pair of heating elements spaced apart in parallel relation within the chamber adjacent to the outlet means, the relative disposition of the outlet means and heating elements being such that the said means are opposite to the space between said elements, and an additional heating element situated adjacent to the first mentioned heating elements at the side remote from the said outlet means, substantially as described.

In testimony whereof I have signed my name to this specification.

Dr. FELIX POLLAK.